United States Patent
Tang

(10) Patent No.: US 11,284,296 B2
(45) Date of Patent: Mar. 22, 2022

(54) METHOD OF SUPPORTING DATA REPLICATION, TRANSMITTING TERMINAL DEVICE AND RECEIVING TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 18 days.

(21) Appl. No.: 16/625,636

(22) PCT Filed: Mar. 13, 2018

(86) PCT No.: PCT/CN2018/078892
§ 371 (c)(1),
(2) Date: Dec. 20, 2019

(87) PCT Pub. No.: WO2019/024504
PCT Pub. Date: Feb. 7, 2019

(65) Prior Publication Data
US 2021/0092637 A1    Mar. 25, 2021

(30) Foreign Application Priority Data

Aug. 4, 2017  (WO) ................ PCT/CN2017/096079
Dec. 21, 2017 (WO) ................ PCT/CN2017/117778

(51) Int. Cl.
*H04W 28/06*    (2009.01)
*H04W 4/40*    (2018.01)
(Continued)

(52) U.S. Cl.
CPC ............ *H04W 28/06* (2013.01); *H04L 67/12* (2013.01); *H04L 69/22* (2013.01); *H04W 4/40* (2018.02); *H04W 72/0406* (2013.01)

(58) Field of Classification Search
CPC ... H04W 28/06; H04W 4/40; H04W 72/0406; H04W 80/02; H04W 4/46; H04W 76/14;
(Continued)

(56) References Cited

U.S. PATENT DOCUMENTS

| | | | |
|---|---|---|---|
| 8,718,647 B2 | 5/2014 | Maheshwari | |
| 2002/0187789 A1* | 12/2002 | Diachina | ............... H04W 72/02 455/452.1 |

(Continued)

FOREIGN PATENT DOCUMENTS

| | | |
|---|---|---|
| CN | 101166193 A | 4/2008 |
| CN | 101299711 A | 11/2008 |

(Continued)

OTHER PUBLICATIONS

International Search Report in the international application No. PCT/CN2018/078892, dated May 31, 2018.
(Continued)

*Primary Examiner* — Peter P Chau
(74) *Attorney, Agent, or Firm* — Perkins Coie LLP

(57) ABSTRACT

Provided in embodiments of the present application are a method of supporting data replication, transmitting terminal device and receiving terminal device capable of realizing reliable transmission of replicated data in a vehicle-to-everything system. The method comprises: a transmitting terminal device transmitting a plurality of radio link control protocol data units (RLC PDUs) to a receiving terminal device, an RLC header of at least one RLC PDU in the
(Continued)

plurality of RLC PDUs comprising an indication field for indicating a radio bearer corresponding to a current RLC PDU.

17 Claims, 4 Drawing Sheets

(51) Int. Cl.
   *H04L 67/12* (2022.01)
   *H04L 69/22* (2022.01)
   *H04W 72/04* (2009.01)

(58) Field of Classification Search
   CPC .......... H04W 4/70; H04L 67/12; H04L 69/22; H04L 67/22; H04L 67/1095; H04L 5/0094; H04L 1/04
   See application file for complete search history.

(56) References Cited

U.S. PATENT DOCUMENTS

| | | | | |
|---|---|---|---|---|
| 2009/0046659 | A1* | 2/2009 | Sebire | H04W 36/02 370/331 |
| 2009/0318152 | A1 | 12/2009 | Maheshwari | |
| 2012/0020278 | A1* | 1/2012 | Moberg | H04B 7/155 370/315 |
| 2015/0373584 | A1 | 12/2015 | Hong | |
| 2016/0057585 | A1 | 2/2016 | Horn et al. | |
| 2016/0234714 | A1* | 8/2016 | Basu Mallick | H04W 28/085 |
| 2016/0286412 | A1 | 9/2016 | Kim et al. | |
| 2016/0295624 | A1 | 10/2016 | Novlan et al. | |
| 2017/0048922 | A1 | 2/2017 | Lee et al. | |
| 2017/0164187 | A1 | 6/2017 | Lu | |
| 2017/0171060 | A1* | 6/2017 | Liu | H04L 67/32 |
| 2018/0191551 | A1 | 7/2018 | Chun | |
| 2019/0098512 | A1* | 3/2019 | Yi | H04W 24/02 |
| 2019/0245657 | A1* | 8/2019 | Lee | H04L 1/1812 |
| 2020/0092746 | A1* | 3/2020 | Baek | H04W 28/06 |
| 2020/0288319 | A1* | 9/2020 | Pham Van | H04W 12/10 |

FOREIGN PATENT DOCUMENTS

| | | |
|---|---|---|
| CN | 102067663 A | 5/2011 |
| CN | 103782569 A | 5/2014 |
| CN | 104969489 A | 10/2015 |
| CN | 105246106 A | 1/2016 |
| CN | 105684501 A | 6/2016 |
| CN | 106664245 A | 5/2017 |
| RU | 2280951 C2 | 7/2006 |
| RU | 2461987 C2 | 9/2012 |
| WO | 2009079854 A1 | 7/2009 |
| WO | 2016068456 A1 | 5/2016 |
| WO | 2017003230 A1 | 1/2017 |
| WO | 2017014716 A1 | 1/2017 |

OTHER PUBLICATIONS

International Search Report in the international application No. PCT/CN2017/096079, dated Apr. 28, 2018.
International Search Report in the international application No. PCT/CN2017/117778, dated May 2, 2018.
Qualcomm Incorporated, "R2-1705055: Further Details of PDCP Duplication in CA Case", 3GPP TSG-RAN WG2 Meeting #98, May 19, 2017 (May 19, 2017), sections 1-3.
LG Electronics Inc, "Packet Duplication in CA", 3GPP TSG-RAN WG2 Meeting #97bis, R2-170xxxx, Apr. 7, 2018 (Apr. 7, 2018), entire document.
3GPP, "TS 38.300 V0.4.1", 3rd Generation Partnership Project, Technical Specification Group Radio Access Network, NR, NR and NG-RAN Overall Description, Stage 2 (Release 15), Jun. 30, 2017 (Jun. 30, 2017), sections 6.4 and 6.6.
ERICSSON: "Controlling of duplication in case of CA", 3GPP Draft; R2-1702753 -Controlling of Duplication in Case of CA, 3rd Generation Partnership Project (3GPP), Mobilecompetence Centre; 650, Route Des Lucioles; F-06921 Sophia-Antipolis Cedex Fran vol. RAN WG2, No. Spokane, USA; Apr. 3, 2017-Apr. 7, 2017 Mar. 25, 2017 (Mar. 25, 2017), XP051254259, Retrieved from the Internet: URL: http://www.3gpp. org/ftp/tsg ran/WG2 RL2/TSGR2 97bis/Docs/ [ retrieved on Mar, 25, 2017] * section 2 *.
OPPO: "MAC operation on the duplicated data from PDCP layer", BGPP Draft; R2-1702546 MAC Operations Onthe Duplicated Data From PDCP Layer, 3rd Generation Partnership Project (3GPP) Mobile Competence Centre; 650, Route Des Lucioles; F-06921 Sophia-Antipolis C vol. RAN WG2, No. Spokane, USA; Apr. 3, 2017-2017040724 Mar. 2017 (Mar. 24, 2017), XP051253208, Retrieved from the Internet: URL http://www.3gpp. org/ftp/tsg_ran/WG2_ RL2/Docs/ [ retrieved on Mar. 24, 2017] section 2 *.
ERICSSON: "MAC sub-header format", 3GPP Draft; R2-1704394 -MAC Sub-Header Format, 3rd Generation Partnership Project (3GPP), Mobile Competence Centre; 650, Route Des Lucioles; F-06921 Sophia-Antipolis Cedex; France vol. RAN WG2, No. Hangzhou; May 15, 2017-May 19, 2017 May 14, 2017 (May 14, 2017), XP051274967, Retrieved from the Internet: URL: http:// www.3gpp. org/ftp/Meet ings 3GPP SYNC/RAN2/Docs/ [ retrieved on May 14, 2017] section 2.1 *.
Supplementary European Search Report in the European application No. 18841323.1, dated Apr. 30, 2020.
English translation of the Written Opinion of the International Search Authority in the international application No. PCT/CN2018/078892, dated May 31, 2018.
English translation of the Written Opinion of the International Search Authority in the international application No. PCT/CN2017/117778, dated May 2, 2018.
English translation of the Written Opinion of the International Search Authority in the international application No. PCT/CN2017/096079, dated Apr. 28, 2018.
Huawei, CATT, LG Electronics, HiSilicon, China Unicorn; "New WID on 3GPP V2X Phase 2", 3GPP TSG RAN Meeting #75, RP-170798, Dubrovnik, Croatia, Mar. 6-9, 2017.
First Office Action of the Chilean application No. 202000032, dated Jan. 20, 2021.
First Office Action of the Canadian application No. 3066605, dated Feb. 2, 2021.
First Office Action of the European application No. 18841323.1, dated Feb. 8, 2021.
First Office Action of the Chinese application No. 202010072503.5, dated May 11, 2021.
3GPP TR 38.912 V1.0.0; 3rd Generation Partnership Project; Technical Specification Group Radio Access Network; Study on New Radio (NR) Access Technology, 03. 2017, 9.4, 9.6.
3GPP TSG-RAN2 Meeting #57bis Tdoc R2-071137, St. Julians, Malta, Mar. 26-30, 2007; Source: Samsung; Title: PDCP/RLC/ MAC header format.
First Office Action of the Russian application No. 2020101950, dated Jul. 6, 2021.
Office Action of the Indian application No. 201917052960, dated Jul. 14, 2021.
Second Office Action of the European application No. 18841323.1, dated Jul. 19, 2021.
Notice of Rejection of the Chinese application No. 202010072503. 5, dated Dec. 8, 2021. 12 pages with English translation.
Second Office Action of the Canadian application No. 3066605, dated Dec. 10, 2021. 4 pages.
Written Opinion of the Singaporean application No. 11201911811S, dated Dec. 29, 2021. 7 pages.
Second Office Action of the Chinese application No. 202010072503. 5, dated Aug. 17, 2021. 22 pages with English translation.
Mediatek Inc, "NR Radio Bearers and Logical Channels", 3GPP TSG-RAN2#94 meeting Tdoc R2-163894 Nanjing, China, May 23-27, 2016. 3 pages.
Third Office Action of the European application No. 18841323.1, dated Oct. 13, 2021. 5 pages.
3GPP TSG-RAN2#NR_AdHoc#2 R2-1706643, Qingdao, China, Jun. 27-29, 2017. Agenda item: 10.3.1.11, Source: ZTE, Title:

(56) References Cited

OTHER PUBLICATIONS

Consideration on the Impact of PDCP Duplication on MAC, Document for: Discussion and Decision, 3 pages.
First Office Action of the Japanese application No. 2019-571489, dated Jan. 25, 2022. 6 pages with English translation.
First Office Action of the Taiwanese application No. 107127176, dated Dec. 28, 2021. 19 pages with English translation.

* cited by examiner

R/R/E/LCID/F/L sub-header with 7-bits L field

R/R/E/LCID/F/L sub-header with 15-bits L field

METHOD OF SUPPORTING DATA REPLICATION, TRANSMITTING TERMINAL DEVICE AND RECEIVING TERMINAL DEVICE

CROSS-REFERENCE

This application is a US National Stage of PCT Application No. PCT/CN2018/078892, filed Mar. 13, 2018, and named after "METHOD OF SUPPORTING DATA REPLICATION, TRANSMITTING TERMINAL DEVICE AND RECEIVING TERMINAL DEVICE", which claims priority to PCT/CN2017/096079, filed Aug. 4, 2017 and PCT/CN2017/117778, filed Dec. 21, 2017, the contents of which are hereby incorporated by reference in its entirety.

TECHNICAL FIELD

The disclosure relates to the field of communications, and more particularly to a method for supporting data duplication, a transmitting device and a receiving device.

BACKGROUND

Internet of vehicles or Vehicle to Everything (V2X) communication is a Sidelink (SL) transmission technology based on Device to Device (D2D) communication. Unlike a conventional Long Term Evolution (LTE) system in which communication data is received or transmitted through a base station, an Internet of vehicles system adopts a D2D communication mode and thus has higher spectrum efficiency and lower transmission delay.

The Internet of vehicles system has a relatively high requirement on a reliability of data transmission, and how to implement reliable data transmission is an urgent problem to be solved.

SUMMARY

Embodiments of the disclosure provide a method for supporting data duplication, a transmitting device and a receiving device, which may implement reliable transmission of duplicated data in an Internet of vehicles system.

According to a first aspect, the embodiment of the disclosure provides a method for supporting data duplication, which includes the following operation.

A transmitting device sends multiple Radio Link Control (RLC) Protocol Data Units (PDUs) to a receiving device. An RLC header of at least one RLC PDU in the multiple RLC PDUs includes an indication field and the indication field is to indicate a radio bearer corresponding to the RLC PDU.

Optionally, the transmitting device may be a terminal device.

Optionally, the receiving device may be a terminal device and may also be a network device (for example, a base station).

Accordingly, in the method for supporting data duplication in the embodiment of the disclosure, when the transmitting device sends the multiple RLC PDUs, the indication field indicating the radio bearer corresponding to the RLC PDU may be included in the RLC header of the at least one RLC PDU in the multiple RLC PDUs. Therefore, the receiving device may determine a radio bearer corresponding to each RLC PDU in the multiple RLC PDUs, and reliable transmission of duplicated data may further be implemented.

Optionally, in an implementation of the first aspect, the indication field may include an Identity (ID) of a radio bearer corresponding to a Packet Data Convergence Protocol (PDCP) corresponding to the RLC PDU.

Optionally, in an implementation of the first aspect, the indication field may include a Logical Channel ID (LCID).

Optionally, in an implementation of the first aspect, the RLC header of the at least one RLC PDU may be an RLC header corresponding to the at least one RLC PDU.

Optionally, in an implementation of the first aspect, the RLC header of the at least one RLC PDU may be an RLC header contained in the at least one RLC PDU.

Optionally, in an implementation of the first aspect, the RLC header may be to form a Media Access Control (MAC) sub-header.

Optionally, in an implementation of the first aspect, at least two RLC PDUs in the multiple RLC PDUs may correspond to different logical channels, and the at least two RLC PDUs may correspond to a same radio bearer.

Optionally, in an implementation of the first aspect, the method may be applied to an Internet of vehicles system.

According to a second aspect, the embodiments of the disclosure provide a method for supporting data duplication, which includes the following operations.

A receiving device receives multiple RLC PDUs sent by a transmitting device.

The receiving device determines a respective radio bearer corresponding to each RLC PDU in the multiple RLC PDUs according to a correspondence between a logical channel and a radio bearer.

Accordingly, in the method for supporting data duplication in the embodiments of the disclosure, the receiving device, when receiving the multiple RLC PDUs, may determine the respective radio bearer corresponding to each RLC PDU in the multiple RLC PDUs according to the correspondence between the logical channel and the radio bearer. Therefore, reliable transmission of duplicated data may further be implemented.

Optionally, in an implementation of the second aspect, an RLC header of at least one RLC PDU in the multiple RLC PDUs may include an indication field, and the indication field may include the radio bearer corresponding to the RLC PDU.

Before the operation that the respective radio bearer corresponding to each RLC PDU in the multiple RLC PDUs is determined according to the correspondence between the logical channel and the radio bearer, the method may further include the following operation.

The correspondence between the logical channel and the radio bearer is determined according to the indication field in the RLC header of the at least one RLC PDU.

Optionally, in an implementation of the second aspect, an RLC header of at least one RLC PDU in the multiple RLC PDUs may include an indication field, and the indication field may include an LCID.

Before the operation that the respective radio bearer corresponding to each RLC PDU in the multiple RLC PDUs is determined according to the correspondence between the logical channel and the radio bearer, the method may further include the following operation.

The correspondence between the logical channel and the radio bearer is determined according to the indication field in the RLC header of the at least one RLC PDU.

Optionally, in an implementation of the second aspect, the correspondence between the logical channel and the radio bearer may be pre-configured.

Optionally, in an implementation of the second aspect, at least two RLC PDUs in the multiple RLC PDUs may correspond to different logical channels, and the at least two RLC PDUs may correspond to a same radio bearer.

Optionally, in an implementation of the second aspect, the method may be applied to an Internet of vehicles system.

Optionally, in an implementation of the second aspect, the RLC header of the at least one RLC PDU may be an RLC header corresponding to the at least one RLC PDU.

Optionally, in an implementation of the second aspect, the RLC header of the at least one RLC PDU may be an RLC header contained in the at least one RLC PDU.

Optionally, in an implementation of the second aspect, the RLC header may be to form a MAC sub-header.

According to a third aspect, the embodiments of the disclosure provide a transmitting device, which includes modules or units configured to execute the method in the first aspect or any optional implementation of the first aspect.

According to a fourth aspect, the embodiments of the disclosure provide a receiving device, which includes modules or units configured to execute the method in the second aspect or any optional implementation of the second aspect.

According to a fifth aspect, there is provided a transmitting device, which includes a processor, a memory and a communication interface. The processor is connected with the memory and the communication interface. The memory is configured to store instructions, the processor is configured to execute the instructions, and the communication interface is configured for communication with another network element under control of the processor. When the processor executes the instructions stored in the memory, such execution enables the processor to execute the method in the first aspect or any possible implementation of the first aspect.

According to a sixth aspect, there is provided a receiving device, which includes a processor, a memory and a communication interface. The processor is connected with the memory and the communication interface. The memory is configured to store instructions, the processor is configured to execute the instructions, and the communication interface is configured for communication with another network element under control of the processor. When the processor executes the instructions stored in the memory, such execution enables the processor to execute the method in the second aspect or any possible implementation of the second aspect.

According to a seventh aspect, there is provided a computer storage medium, in which a program code is stored, the program code including instructions configured to instruct a computer to execute the method in the first aspect or any possible implementation of the first aspect.

According to an eighth aspect, there is provided a computer storage medium, in which a program code is stored, the program code including instructions configured to instruct a computer to execute the method in the second aspect or any possible implementation of the second aspect.

According to a ninth aspect, there is provided a computer program product including instructions, which is adapted to enable the computer to execute the method in each aspect when said program product is run on a computer.

DETAILED DESCRIPTION

The technical solutions in the embodiments of the disclosure will be clearly and completely described below in combination with the drawings in the embodiments of the disclosure.

It is to be understood that the technical solutions in the embodiments of the disclosure may be applied to an Internet of vehicles system, and the Internet of vehicles system may be based on various communication systems, for example, a Long Term Evolution (LTE)-D2D-based Internet of vehicles system. Unlike a manner of receiving or sending communication data between terminals through a network device (for example, a base station) in a conventional LTE system, a D2D communication manner is adopted for the Internet of vehicles system, and thus higher spectral efficiency and a lower transmission delay are ensured.

Optionally, the communication system on which the Internet of vehicles system is based may be a Global System of Mobile communication (GSM) system, a Code Division Multiple Access (CDMA) system, a Wideband Code Division Multiple Access (WCDMA) system, a General Packet Radio Service (GPRS) system, an LTE system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, a New Radio (NR) or future 5th-Generation (5G) system and the like.

A terminal device in the embodiments of the disclosure may refer to an in-vehicle terminal device, and may also be a terminal device in a 5G network, a terminal device in a future evolved Public Land Mobile Network (PLMN) or the like. There are no limits made in the embodiments of the disclosure.

Each embodiment of the disclosure is described in combination with a network device. In the embodiments of the disclosure, the network device may be a device configured to communicate with the terminal device. The network device may be a Base Transceiver Station (BTS) in the GSM system or the CDMA system, may also be a NodeB (NB) in the WCDMA system, may also be an Evolutional Node B (eNB or eNodeB) in the LTE system and may further be a wireless controller in a Cloud Radio Access Network (CRAN) scenario. The network device may be a relay station, an access point, an in-vehicle device, a wearable device, a network device in the future 5G network, a network device in the future evolved PLMN or the like. There are no limits made in the embodiments of the disclosure.

Figure 1:
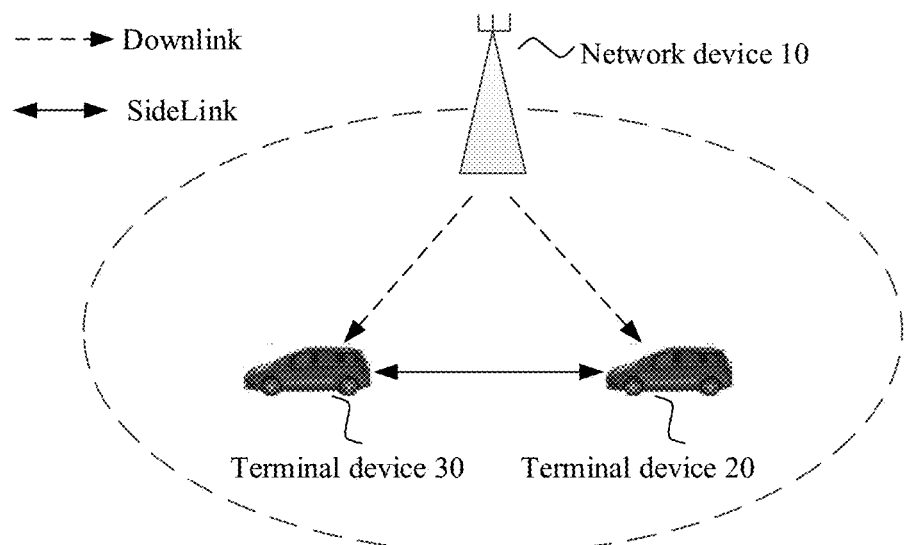
FIG. 1 is a schematic diagram showing an application scenario according to an embodiment of the disclosure.
Figure 2:
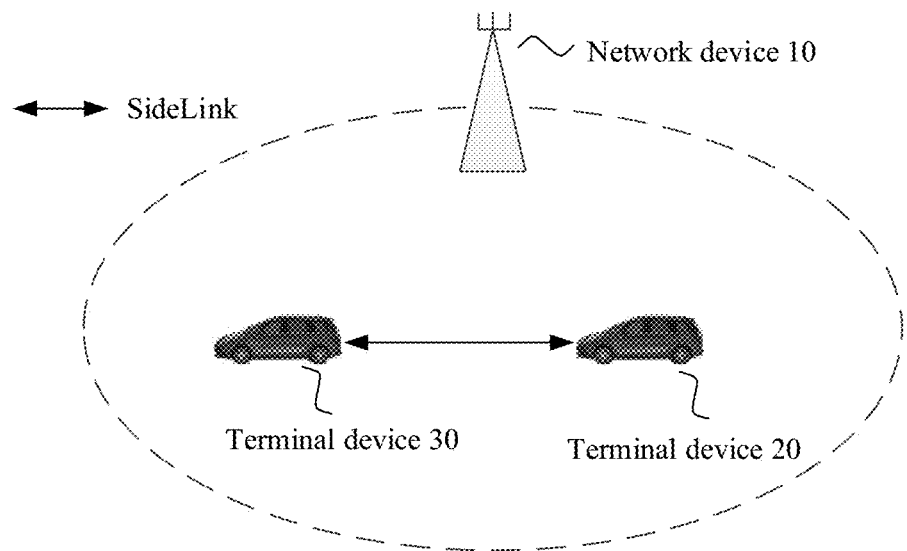
FIG. 2 is a schematic diagram showing an application scenario according to another embodiment of the disclosure.

FIG. 1 and FIG. 2 are schematic diagrams showing an application scenario according to an embodiment of the disclosure, respectively. A network device and two terminal devices are exemplarily shown in FIG. 1. Optionally, a wireless communication system in the embodiment of the disclosure may include multiple network devices and another number of terminal devices may be included in coverage of each network device. There are no limits made thereto in the embodiment of the disclosure. In addition, the wireless communication system may further include other network entities such as a Mobile Management Entity (MME), a Serving Gateway (S-GW) and a Packet data Network Gateway (P-GW). However, the embodiments of the disclosure are not limited thereto.

Specifically, the terminal device 20 may communicate with the terminal device 30 in a D2D communication mode. During the D2D communication, the terminal device 20 directly communicates with the terminal device 30 through a D2D link, i.e., an SL. As shown in FIG. 1 or FIG. 2, the terminal device 20 directly communicates with the terminal device 30 through the SL. In FIG. 1, the terminal device 20 communicates with the terminal device 30 through the SL, and a transmission resource is allocated by the network device. In FIG. 2, the terminal device 20 communicates with the terminal device 30 through the SL, the transmission resource is selected independently by the terminal device, and the transmission resource is not required to be allocated by the network device.

D2D communication may refer to Vehicle to Vehicle (V2V) communication or V2X communication. In the V2X communication, X may generally refer to any device with a wireless receiving and sending capability, for example, but not limited to, a wireless apparatus moving at a low speed, an in-vehicle device moving at a high speed or a network control node with a wireless transmitting and receiving capability. It is to be understood that the embodiments of the disclosure are mainly applied to a V2X communication scenario, and may also be applied to any other D2D communication scenario. There are no limits made thereto in the embodiments of the disclosure.

In an Internet of vehicles system, two types of terminal devices may exist, i.e., a terminal device with a sensing capability, for example, Vehicle User Equipment (VUE) or Pedestrian User Equipment (PUE), and a terminal device without any sensing capability, for example, a PUE. VUE has a higher processing capability, and is usually powered by a storage battery in a vehicle. PUE has a relatively low processing capability, and reduction in power consumption is also a main factor required to be considered for PUE. Therefore, in an existing Internet of vehicles system, VUE is considered to have a complete receiving capability and sensing capability, while PUE is considered to have partial or no receiving and sensing capabilities. If the PUE has partial sensing capability, a sensing method similar to that of the VUE may be adopted for resource selection thereof, and an available resource is selected from resources that can be sensed. If the PUE has no sensing capability, the PUE randomly selects a transmission resource from a resource pool.

In 3rd generation partnership project (3GPP) Release-14, two transmission modes has been defined, i.e., a transmission mode 3 (mode 3) and a transmission mode 4 (mode 4). In the mode 3, a transmission resource for a terminal device is allocated by a base station, and the terminal device performs data transmission on an SL according to the resource allocated by the base station. The base station may allocate a resource for single transmission to the terminal device and may also allocate a resource for semi-persistent transmission to the terminal device. In the mode 4, if a terminal device has a sensing capability, data is transmitted in a manner combining sensing and reservation, and if the terminal device has no sensing capability, a transmission resource is randomly selected from a resource pool. The terminal device with the sensing capability acquires an available resource collection from the resource pool by sensing, and the terminal device randomly selects a resource from the resource collection for data transmission. Since a service in the Internet of vehicles system is periodic, the terminal device usually adopts a semi-persistent transmission manner, namely the terminal device, after selecting a transmission resource, may keep using the resource in multiple transmission cycles, so that probabilities of resource reselection and resource conflict are reduced. The terminal device may carry information for reserving a next transmission resource in control information transmitted this time such that another terminal device may detect the control information of the terminal device to determine whether the resource is reserved and used by the terminal device or not, so as to reduce resource conflicts.

Since the resource is scheduled by the base station in the mode 3 and the resource pool is pre-configured or configured by the base station in the mode 4, there will be no overlapping of resource pools in these two modes, namely the resource pools corresponding to the mode 3 and the mode 4 respectively are separated or do not overlap each other. A terminal device in the mode 3 performs data transmission on a time-frequency resource in the resource pool supporting the mode 3, and a terminal device in the mode 4 performs data transmission on a time-frequency resource in the resource pool supporting the mode 4.

For a terminal device supporting a 3GPP Release-15 communication protocol, two transmission modes, for example, the mode 3 and the mode 4, are also supported. When a terminal device supporting Release-15 and a terminal device supporting Release-14 perform data transmission together in a communication system, the terminal device with the sensing capability may select a resource by resource sensing, and the terminal device without the sensing capability may inevitably interfere with data transmission of another terminal device. Since a terminal device in the mode 3 is connected with a base station and a transmission resource therefor is allocated by the base station, it is more necessary to protect transmission reliability of the terminal device in the mode 3 when the terminal device in the mode 3 and a terminal device in the mode 4 coexist.

Figure 3:
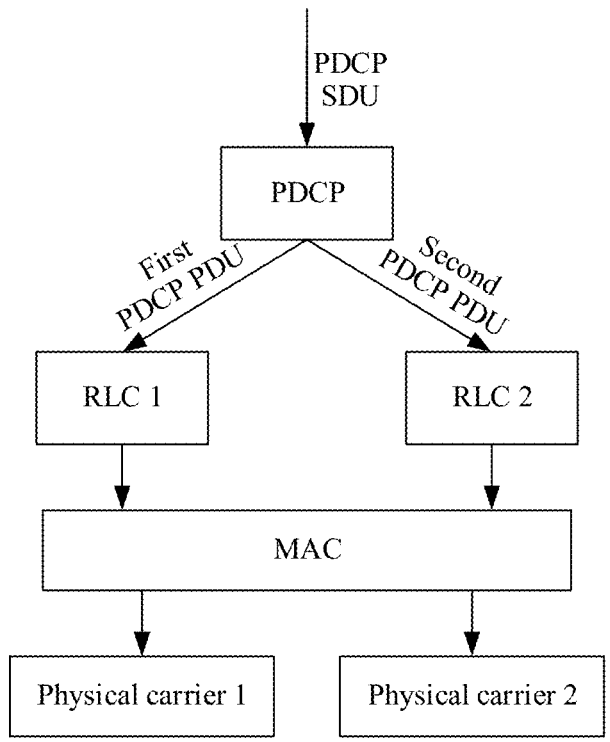
FIG. 3 is a schematic diagram showing data transmission through carrier aggregation according to an embodiment of the disclosure.

Optionally, as shown in FIG. 3, in the Internet of vehicles system, a terminal device may send the same PDCP-layer data to a network device or another terminal device through two carriers based on carrier aggregation. Specifically, as shown in FIG. 3, a PDCP entity is bound with two RLC entities. The terminal device performs duplication on a first PDCP PDU to be sent to obtain a second PDCP PDU. The terminal device transmits the first PDCP PDU to one RLC entity RLC1 in the two RLC entities and transmits the second PDCP PDU to the other RLC entity RLC2 in the two RLC entities. The two RLC entities process the received PDCP PDUs respectively and send the first PDCP PDU and the second PDCP PDU to a network device or another terminal device through two different carriers.

It is to be understood that the terminal device, when receiving data sent by the network device or another terminal device, may execute an inverse process of the data sending process shown in FIG. 3.

In addition, each aspect or characteristic of the disclosure may be implemented as a method, a device or article of manufacture using standard programming and/or engineering techniques. The term "article of manufacture" used in the disclosure covers a computer program which may be accessed from any computer-readable device, carrier or medium. For example, the computer-readable medium may include, but not limited to: a magnetic storage device (for example, a hard disk, a floppy disk or a magnetic tape), an optical disk (for example, a Compact Disk (CD) and a Digital Versatile Disk (DVD)), a smart card and a flash memory device (for example, an Erasable Programmable Read-Only Memory (EPROM), a card, a stick or a key driver). In addition, various storage medium described in the disclosure may represent one or more devices and/or other machine-readable medium configured to store information. The term "machine-readable medium" may include, but not limited to, various medium capable of storing, including and/or bearing instructions and/or data.

It is to be understood that terms "system" and "network" are herein often used interchangeably. In the disclosure, the term "and/or" is used merely to describe an association of associated objects and represents that three relationships may exist. For example, A and/or B may represent that there are three cases, i.e., A exists separately, A and B exist at the same time, and B exists separately. In addition, character "/" in the disclosure usually represents that previous and next associated objects form an "or" relationship.

Figure 4:
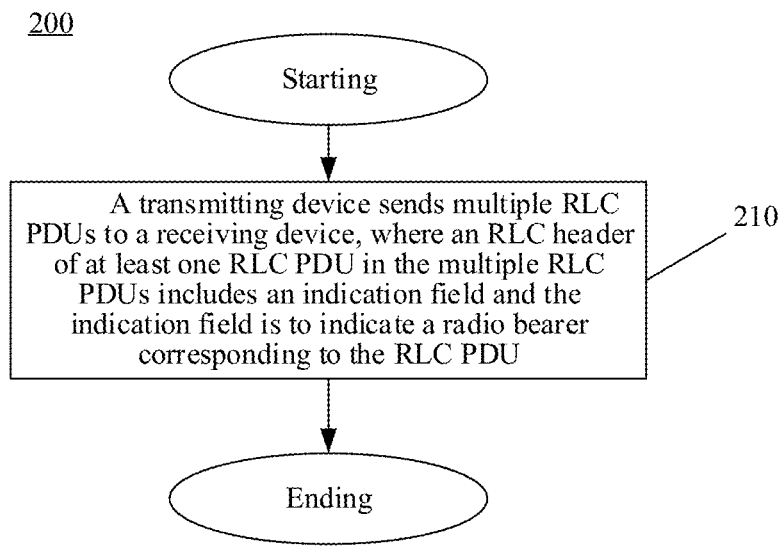
FIG. 4 is a schematic flowchart showing a method for supporting data duplication according to an embodiment of the disclosure.

FIG. 4 is a schematic flowchart of a method 200 for supporting data duplication according to an embodiment of the disclosure. As shown in FIG. 4, the method 200 may be executed by a transmitting device, the transmitting device may be the terminal device shown in FIG. 1 or FIG. 2, and the terminal device may execute data transmission shown in FIG. 3. A receiving device in the method 200 may be the network device shown in FIG. 1, and may be the terminal device shown in FIG. 1 or FIG. 2, and the method 200 may be applied to an Internet of vehicles system. The method 200 includes the following contents.

At 210, the transmitting device sends multiple RLC PDUs to the receiving device. An RLC header of at least one RLC PDU in the multiple RLC PDUs includes an indication field and the indication field is to indicate a radio bearer corresponding to the RLC PDU.

It is to be understood that the transmitting device, when performing data duplication through carrier aggregation, sends at least two RLC PDUs.

Optionally, the transmitting device, when performing the data duplication through carrier aggregation, is required to indicate the radio bearer corresponding to the RLC PDU through the indication field.

Optionally, the indication field includes an ID of a radio bearer corresponding to a PDCP corresponding to the RLC PDU.

Optionally, the indication field includes an LCID.

There may also be another manner, namely the indication field includes the LCID and a reserved bit. Different values may be assigned to the reserved bit to distinguish two different logical channels serving the same bearer. Specifically, the following manner is adopted.

On carrier-1: a MAC Service Data Unit (SDU) A is transmitted through a logical channel A with reserved bit=0, LCID=X, e.g., X=00001.

On carrier-2: another MAC SDU B (it may be understood as a duplicated SDU) is transmitted through a logical channel B with reserved bit=1, LCID=X, e.g., X=00001.

Figure 10:
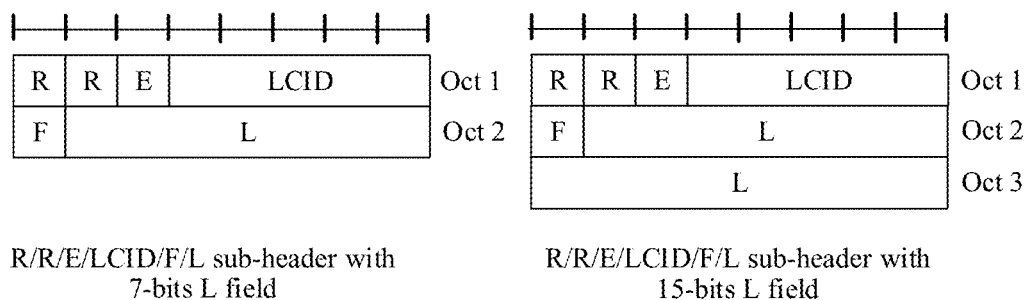
FIG. 10 is a schematic diagram showing two frame structures according to an embodiment of the disclosure.

It is to be pointed out that the logical channels A and B serve the same PDCP entity to implement a PDCP duplication operation. With the above method, a reserved LCID space may be kept, and a duplication feature may be extended to PC5-S message as well. Referring to FIG. 10, R represents a position of the reserved bit, one of which is a frame structure including a 7-bits L field and the other is a frame structure including a 15-bits L field. Elaborations are omitted herein.

Optionally, the RLC header of the at least one RLC PDU is: an RLC header corresponding to the at least one RLC PDU, or an RLC header included in the at least one RLC PDU.

Optionally, at least two RLC PDUs in the multiple RLC PDUs correspond to different logical channels, and the at least two RLC PDUs correspond to a same radio bearer.

Accordingly, in the method for supporting data duplication in the embodiment of the disclosure, when the transmitting device transmits the multiple RLC PDUs, the RLC header of the at least one RLC PDU in the multiple RLC PDUs may include the indication field indicating the radio bearer corresponding to the RLC PDU. Therefore, the receiving device may determine a radio bearer corresponding to each RLC PDU in the multiple RLC PDUs, and reliable transmission of duplicated data may be implemented.

Figure 5:
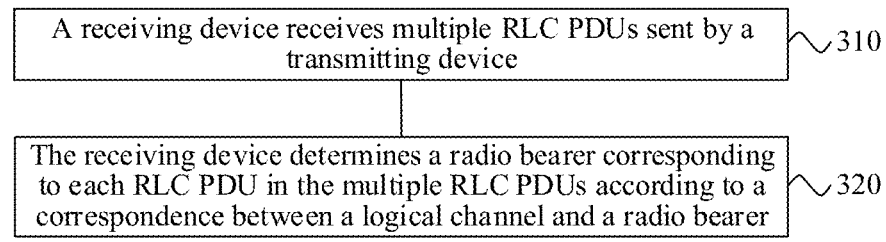
FIG. 5 is a schematic flowchart showing a method for supporting data duplication according to another embodiment of the disclosure.

FIG. 5 is a schematic flowchart of a method 300 for supporting data duplication according to an embodiment of the disclosure. As shown in FIG. 5, the method 300 may be executed by a receiving device, and the receiving device may be the network device shown in FIG. 1 and may also be the terminal device shown in FIG. 1 or FIG. 2. A transmitting device in the method 300 may be the terminal device shown in FIG. 1 or FIG. 2, the terminal device may execute data transmission shown in FIG. 3, and the method 300 may be applied to the Internet of vehicles system. The method 300 includes the following contents.

At 310, the receiving device receives multiple RLC PDUs sent by the transmitting device.

Optionally, an RLC header of at least one RLC PDU in the multiple RLC PDUs includes an indication field.

Optionally, the indication field includes a radio bearer corresponding to the RLC PDU.

Optionally, the indication field includes an LCID.

Optionally, the receiving device determines a correspondence between a logical channel and a radio bearer according to the indication field in the RLC header of the at least one RLC PDU.

Optionally, the indication field may only include content with 1 bit. For example, when it is specified in a protocol that 00010 may only perform a data duplication service together with 00001 or each supports a respective bearer, the indication field may only include the content with 1 bit to indicate the radio bearer corresponding to the present RLC PDU.

Optionally, the correspondence between the logical channel and the radio bearer is pre-configured, for example, determined through the protocol.

For example, Table 1 is an LCID allocation table. 01011-10100 in reserved indexes may be allocated to an RLC serving for data duplication. For example, a logical channel 00001 and a logical channel 01011 may serve a PDCP entity for a bearer 1 together, and a logical channel 00010 and a logical channel 01100 may serve a PDCP entity for a bearer 2 together.

TABLE 1

| Index | LCID values |
|---|---|
| 00000 | Reserved |
| 00001-01010 | LCID |
| 01011-11011 | Reserved |
| 11100 | PC5-S messages that are not protected |
| 11101 | PC5-S messages "Direct Security Mode Command" and "Direct Security Mode Complete" |
| 11110 | Other PC5-S messages that are protected |
| 11111 | Padding |

It is also to be noted that the RLC header of the at least one RLC PDU is optionally: an RLC header corresponding to the at least one RLC PDU, or an RLC header contained in the at least one RLC PDU.

That is, two corresponding manners may be adopted for an RLC PDU and an RLC header. One manner is that the RLC PDU corresponds to the RLC header. That is, in this relationship, the RLC PDU may not contain the RLC header and, instead, the RLC header exists outside the RLC PDU. In such case, the RLC header may form a MAC sub-header. Therefore, the RLC PDU and the RLC header forming the MAC sub-header may be combined with a MAC header to form a data unit of a MAC layer.

The other manner is that the RLC PDU contains the RLC header. In this manner, the RLC PDU forms the data unit of the MAC layer. The data unit of the MAC layer may be a MAC PDU.

There may also be another manner, namely the indication field includes the LCID and a reserved bit. Different values may be assigned to the reserved bit to distinguish two different logical channels serving the same bearer. Specifically, the following manner is adopted.

On carrier 1: a MAC SDU A is transmitted through a logical channel A with reserved bit=0, LCID=X, e.g., X=00001.

On carrier 2: another MAC SDU B (it may be understood as a duplicated SDU) is transmitted through a logical channel B with reserved bit=1, LCID=X, e.g., X=00001.

It is to be pointed out that the logical channels A and B serve the same PDCP entity to implement a PDCP duplication operation. With the above method, a reserved LCID space may be kept, and a duplication feature may be extended to PC5-S message as well. Referring to FIG. 10, R represents a position of the reserved bit, one of which is a frame structure including a 7-bits L field and the other is a frame structure including a 15-bits L field. Elaborations are omitted herein.

At 320, the receiving device determines a respective radio bearer corresponding to each RLC PDU in the multiple RLC PDUs according to a correspondence between a logical channel and a radio bearer.

Accordingly, in the method for supporting data duplication in the embodiment of the disclosure, the receiving device, when receiving the multiple RLC PDUs, may determine the respective radio bearer corresponding to each RLC PDU in the multiple RLC PDUs according to the correspondence between the logical channel and the radio bearer. Therefore, reliable transmission of duplicated data may further be implemented.

Figure 6:
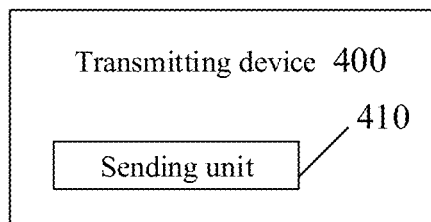
FIG. 6 is a schematic block diagram showing a transmitting device according to an embodiment of the disclosure.

FIG. 6 is a schematic block diagram of a transmitting device 400 according to an embodiment of the disclosure. As shown in FIG. 6, the transmitting device 400 includes a sending module 410.

The sending unit 410 is configured to send multiple RLC PDUs to a receiving device, an RLC header of at least one RLC PDU in the multiple RLC PDUs includes an indication field and the indication field is to indicate a radio bearer corresponding to the RLC PDU.

Optionally, the indication field includes an ID of a radio bearer corresponding to a PDCP corresponding to the RLC PDU.

Optionally, the indication field includes an LCID.

There may also be another manner, namely the indication field includes the LCID and a reserved bit. Different values may be assigned to the reserved bit to distinguish two different logical channels serving the same bearer. Specifically, the following manner is adopted.

On carrier 1: a MAC SDU A is transmitted through a logical channel A with reserved bit=0, LCID=X, e.g., X=00001.

On carrier 2: another MAC SDU B (it may be understood as a duplicated SDU) is transmitted through a logical channel B with reserved bit=1, LCID=X, e.g., X=00001.

It is to be pointed out that the logical channels A and B serve the same PDCP entity to implement a PDCP duplication operation. With the above method, a reserved LCID space may be kept, and a duplication feature may be extended to PC5-S message as well. Referring to FIG. 10, R represents a position of the reserved bit, one of which is a frame structure including a 7 bits L field and the other is a frame structure including a 15 bits L field. Elaborations are omitted herein.

Optionally, at least two RLC PDUs in the multiple RLC PDUs correspond to different logical channels, and the at least two RLC PDUs correspond to a same radio bearer.

Optionally, the transmitting device 400 is applied to an Internet of vehicles system.

It is to be understood that the abovementioned and other operations and/or functions of each module in the transmitting device 400 according to the embodiment of the disclosure are adopted to implement the corresponding flows executed by the transmitting device in the method 200 in FIG. 4 respectively and, for simplicity, will not be elaborated herein.

Figure 7:
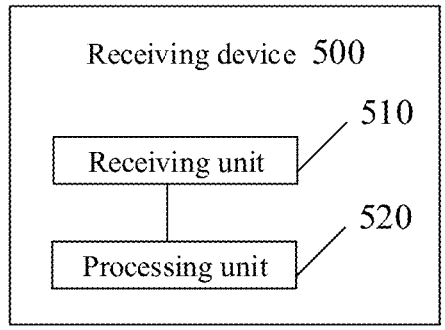
FIG. 7 is a schematic block diagram showing a receiving device according to an embodiment of the disclosure.

FIG. 7 is a schematic block diagram of a receiving device 500 according to an embodiment of the disclosure. As shown in FIG. 7, the receiving device 500 includes a receiving unit 510 and a processing unit 520.

The receiving unit 510 is configured to receive multiple RLC PDUs sent by a transmitting device.

The processing unit 520 is configured to determine a respective radio bearer corresponding to each RLC PDU in the multiple RLC PDUs according to a correspondence between a logical channel and a radio bearer.

Optionally, an RLC header of at least one RLC PDU in the multiple RLC PDUs includes an indication field, and the indication field includes the radio bearer corresponding to the RLC PDU.

Before the processing unit 520 determines the respective radio bearer corresponding to each RLC PDU in the multiple RLC PDUs according to the correspondence between the logical channel and the radio bearer, the processing unit 520 is further configured to determine the correspondence between the logical channel and the radio bearer according to the indication field in the RLC header of the at least one RLC PDU.

Optionally, an RLC header of at least one RLC PDU in the multiple RLC PDUs includes an indication field, and the indication field includes an LCID.

Before the processing unit 520 determines the respective radio bearer corresponding to each RLC PDU in the multiple RLC PDUs according to the correspondence between the logical channel and the radio bearer, the processing unit 520 is further configured to determine the correspondence between the logical channel and the radio bearer according to the indication field in the RLC header of the at least one RLC PDU.

There may also be another manner, namely the indication field includes the LCID and a reserved bit. Different values may be assigned to the reserved bit to distinguish two different logical channels serving the same bearer. Specifically, the following manner is adopted.

On carrier 1: a MAC SDU A is transmitted through a logical channel A with reserved bit=0, LCID=X, e.g., X=00001.

On carrier 2: another MAC SDU B (it may be understood as a duplicated SDU) is transmitted through a logical channel B with reserved bit=1, LCID=X, e.g., X=00001.

It is to be pointed out that the logical channels A and B serve the same PDCP entity to implement a PDCP duplication operation. With the above method, a reserved LCID space may be kept, and a duplication feature may be extended to PC5-S message as well. Referring to FIG. 10, R represents a position of the reserved bit, one of which is a frame structure including a 7 bits L field and the other is a frame structure including a 15-bits L field. Elaborations are omitted herein.

Optionally, the correspondence between the logical channel and the radio bearer is pre-configured.

Optionally, at least two RLC PDUs in the multiple RLC PDUs correspond to different logical channels, and the at least two RLC PDUs correspond to a same radio bearer.

Optionally, the receiving device 500 is applied to an Internet of vehicles system.

It is to be understood that the abovementioned and other operations and/or functions of each module in the receiving device 500 according to the embodiment of the disclosure are adopted to implement the corresponding flows executed by the receiving device in the method 300 in FIG. 5 respectively and, for simplicity, will not be elaborated herein.

Figure 8:
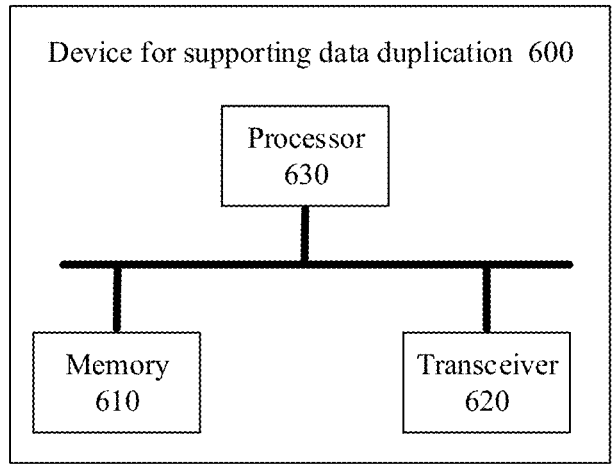
FIG. 8 is a schematic block diagram showing a device for supporting data duplication according to an embodiment of the disclosure.

FIG. 8 is a schematic block diagram of a device 600 for supporting data duplication according to an embodiment of the disclosure. The device 600 includes a memory 610, a transceiver 620 and a processor 630.

The memory 610 is configured to store a program, the program including a code.

The transceiver 620 is configured to communicate with another device.

The processor 630 is configured to execute the program code in the memory 610.

Optionally, when the code is executed, the processor 630 may further be configured to implement each operation executed by the transmitting device in the method 200 in FIG. 4. For simplicity, no more elaborations will be made herein. In such case, the device 600 may be a terminal device, for example, VUE.

Optionally, when the code is executed, the processor 630 may be configured to implement each operation executed by the receiving device in the method 300 in FIG. 5. For simplicity, no more elaborations will be made herein. In such case, the device 600 may be an access network device and may also be a core network device. The transceiver 620 is configured to execute specific signal transmission and reception when driven by the processor 630.

It is to be understood that, in the embodiment of the disclosure, the processor 630 may be a Central Processing Unit (CPU) and the processor 630 may also be another universal processor, a Digital Signal Processor (DSP), an Application Specific Integrated Circuit (ASIC), an Field-Programmable Gate Array (FPGA) or another programmable logic device, discrete gate or transistor logic device, discrete hardware component and the like. The universal processor may be a microprocessor or the processor may also be any conventional processor and the like.

The memory 610 may include a Read-Only Memory (ROM) and a Random Access Memory (RAM) and provides an instruction and data for the processor 630. A portion of the memory 610 may further include a nonvolatile RAM. For example, the memory 610 may further store information of a device type.

The transceiver 620 may be configured to implement signal sending and receiving functions, for example, frequency modulation and demodulation functions or, up-conversion and down-conversion functions.

In an implementation process, at least one step of the method may be completed through an integrated logical circuit in hardware form in the processor 630, or the integrated logical circuit may be driven by instructions in a software form to complete the at least one step. Therefore, the device 600 for supporting data duplication may be a chip or a chip set. The steps of the method disclosed in combination with the embodiments of the disclosure may be directly embodied to be executed and completed by a hardware processor or by a combination of software modules and the hardware in the processor. The software modules may be located in a mature storage medium in this field such as a RAM, a flash memory, a ROM, a programmable ROM or electrically erasable programmable ROM and a register. The storage medium is located in the memory, and the processor 630 reads information in the memory and completes the steps of the methods in combination with the hardware therein. No more detailed descriptions will be made herein to avoid repetitions.

Figure 9:
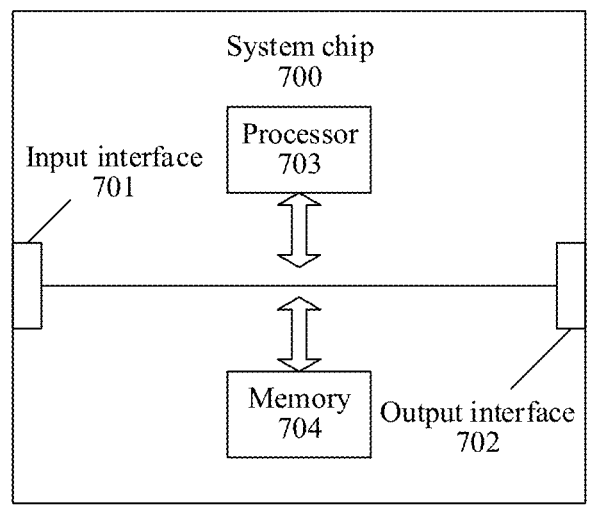
FIG. 9 is a schematic structure diagram showing a system chip according to an embodiment of the disclosure.

FIG. 9 is a schematic structure diagram of a system chip 700 according to an embodiment of the disclosure. The system chip 700 in FIG. 9 includes an input interface 701, an output interface 702, a processor 703 and a memory 704 which may be connected through an internal communication connecting line. The processor 703 is configured to execute a code in the memory 704.

Optionally, when the code is executed, the processor 703 is configured to implement methods executed by a transmitting device in the method embodiments. For simplicity, no more elaborations will be made herein.

Optionally, when the code is executed, the processor 703 is configured to implement methods executed by a receiving device in the method embodiments. For simplicity, no more elaborations will be made herein.

The embodiments may be implemented completely or partially through software, hardware, firmware or any combination thereof. During implementation with the software, the embodiments may be implemented completely or partially in form of computer program product. The computer program product includes one or more computer instructions. When the computer program instruction is loaded and executed on a computer, the flows or functions according to the embodiments of the disclosure are completely or partially generated. The computer may be a universal computer, a dedicated computer, a computer network or another programmable device. The computer instruction may be stored in a computer-readable storage medium or may be transmitted from one computer-readable storage medium to another computer-readable storage medium. For example, the computer instruction may be transmitted from a website, a computer, a server or a data center to another website, computer, server or data center in a wired (for example, coaxial cable, optical fiber and Digital Subscriber Line (DSL)) or wireless (for example, infrared, wireless and microwave) manner. The computer-readable storage medium may be any available medium accessible for the computer or a data storage device, such as a server and a data center, including one or more integrated available media. The available medium may be a magnetic medium (for example, a floppy disk, a hard disk and a magnetic tape), an optical medium (for example, a DVD), a semiconductor medium (for example, a Solid State Disk (SSD)) or the like.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

Those skilled in the art may clearly understand that specific working processes of the system, device and unit described above may refer to the corresponding processes in the method embodiments and will not be elaborated herein for convenient and brief description.

Disclosed above are merely several specific embodiments of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for supporting data duplication, comprising:
   sending, by a transmitting device configured to perform data duplication through carrier aggregation, a plurality of Radio Link Control (RLC) Protocol Data Units (PDUs) to a receiving device, wherein an RLC header of at least one RLC PDU in the plurality of RLC PDUs comprises an indication field and the indication field is to indicate a radio bearer corresponding to the at least one RLC PDU, and wherein
   the indication field comprises a Logical Channel Identity (LCID) and a reserved bit, and different values are assigned to the reserved bit to distinguish two different logical channels serving a same radio bearer.

2. The method of claim 1, wherein the RLC header of the at least one RLC PDU is:
   an RLC header corresponding to the at least one RLC PDU.

3. The method of claim 2, wherein the RLC header is to form a Media Access Control (MAC) sub-header.

4. The method of claim 1, wherein at least two RLC PDUs in the plurality of RLC PDUs correspond to different logical channels, and the at least two RLC PDUs correspond to the same radio bearer.

5. The method of claim 1, wherein the method is applied to an Internet of vehicles system.

6. A transmitting device, comprising:
   a transceiver;
   a processor; and
   a memory for storing instructions executable by the processor,
   wherein the processor is configured to execute the instructions to:
   perform data duplication through carrier aggregation;
   control the transceiver to send a plurality of Radio Link Control (RLC) Protocol Data Units (PDUs) to a receiving device, wherein an RLC header of at least one RLC PDU in the plurality of RLC PDUs comprises an indication field and the indication field is to indicate a radio bearer corresponding to the at least one RLC PDU, and wherein
   the indication field comprises a Logical Channel Identity (LCID) and a reserved bit, and different values are assigned to the reserved bit to distinguish two different logical channels serving a same radio bearer.

7. The transmitting device of claim 6, wherein the RLC header of the at least one RLC PDU is:
   an RLC header corresponding to the at least one RLC PDU.

8. The transmitting device of claim 7, wherein the RLC header is to form a Media Access Control (MAC) sub-header.

9. The transmitting device of claim 6, wherein at least two RLC PDUs in the plurality of RLC PDUs correspond to different logical channels, and the at least two RLC PDUs correspond to the same radio bearer.

10. The transmitting device of claim 6, wherein the transmitting device is applied to an Internet of vehicles system.

11. A receiving device, comprising:
    a transceiver;
    a processor; and
    a memory for storing instructions executable by the processor,
    wherein the processor is configured to execute the instructions to:
    perform data duplication through carrier aggregation;
    control the transceiver to receive a plurality of Radio Link Control (RLC) Protocol Data Units (PDUs) sent by a transmitting device; and
    determine a respective radio bearer corresponding to each RLC PDU in the plurality of RLC PDUs according to a correspondence between a logical channel and a radio bearer, wherein
    an RLC header of at least one RLC PDU in the plurality of RLC PDUs comprises an indication field, and the indication field comprises the radio bearer corresponding to the at least one RLC PDU, and wherein
    the indication field comprises a Logical Channel Identity (LCID) and a reserved bit, and different values are assigned to the reserved bit to distinguish two different logical channels serving a same radio bearer.

12. The receiving device of claim 11, wherein
    before the processor determines the respective radio bearer corresponding to each RLC PDU in the plurality of RLC PDUs according to the correspondence between the logical channel and the radio bearer, the processor is further configured to determine the correspondence between the logical channel and the radio bearer according to the indication field in the RLC header of the at least one RLC PDU.

13. The receiving device of claim 11, wherein the correspondence between the logical channel and the radio bearer is pre-configured.

14. The receiving device of claim 11, wherein at least two RLC PDUs in the plurality of RLC PDUs correspond to different logical channels, and the at least two RLC PDUs correspond to a same radio bearer.

15. The receiving device of claim 11, wherein the receiving device is applied to an Internet of vehicles system.

16. The receiving device of claim 11, wherein the RLC header of the at least one RLC PDU is:
    an RLC header corresponding to the at least one RLC PDU.

17. The receiving device of claim 16, wherein the RLC header is to form a Media Access Control (MAC) subheader.

\* \* \* \* \*